`US010573182B2`

(12) United States Patent
Yang et al.

(10) Patent No.: US 10,573,182 B2
(45) Date of Patent: Feb. 25, 2020

(54) COLLISION AVOIDANCE APPARATUS AND METHOD FOR VEHICLE

(71) Applicant: NATIONAL CHUNG SHAN INSTITUTE OF SCIENCE AND TECHNOLOGY, Taoyuan (TW)

(72) Inventors: Li-Feng Yang, Taoyuan (TW); Chien-Jung Chiu, Taoyuan (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 146 days.

(21) Appl. No.: 15/839,101

(22) Filed: Dec. 12, 2017

(65) Prior Publication Data

US 2019/0180622 A1    Jun. 13, 2019

(51) Int. Cl.

| | |
|---|---|
| *G08G 1/16* | (2006.01) |
| *G01S 13/93* | (2020.01) |
| *G01S 13/34* | (2006.01) |
| *B60W 30/09* | (2012.01) |
| *B60W 50/14* | (2020.01) |
| *G08G 5/00* | (2006.01) |
| *B60W 30/095* | (2012.01) |
| *G08G 5/04* | (2006.01) |
| *G01S 13/931* | (2020.01) |

(52) U.S. Cl.
CPC ............ *G08G 1/166* (2013.01); *B60W 30/09* (2013.01); *B60W 30/095* (2013.01); *B60W 50/14* (2013.01); *G01S 13/345* (2013.01); *G01S 13/931* (2013.01); *G01S 13/9303* (2013.01); *G08G 1/163* (2013.01); *G08G 5/0008* (2013.01); *G08G 5/0021* (2013.01); *G08G 5/0078* (2013.01); *G08G 5/045* (2013.01); *B60W 2420/52* (2013.01); *B60W 2750/308* (2013.01)

(58) Field of Classification Search
CPC ... G08G 1/166; G08G 5/0078; B60W 30/095; B60W 30/09; B60W 50/14; B60W 2750/308; B60W 2420/52; G01S 13/9303; G01S 13/931; G01S 13/345
See application file for complete search history.

(56) References Cited

U.S. PATENT DOCUMENTS

| | | | |
|---|---|---|---|
| 7,864,096 B2* | 1/2011 | Stayton | G08G 5/0008 342/29 |
| 9,971,021 B2* | 5/2018 | Moses | G01S 13/9303 |

(Continued)

*Primary Examiner* — Michael J Zanelli
(74) *Attorney, Agent, or Firm* — Schmeiser, Olsen & Watts, LLP

(57) ABSTRACT

A collision avoidance apparatus for a vehicle includes a data collection module, collecting first automatic dependent surveillance broadcast (ADS-B) data of the vehicle itself, second ADS-B data of at least other one vehicle and a detection result related to a radar reflection wave reflected from an object within a first range; and a possible collision determination/avoidance module, electrically connected to the data collection module, determining whether the other one vehicle will collide with the vehicle according to the first and second ADS-B data and whether the object will collide with the vehicle according to the detection result, so as to generate a determination result, wherein the signal processing module generate a control signal to control the vehicle perform a corresponding action according to the determination result. Thus, collision avoidance can be achieved.

16 Claims, 4 Drawing Sheets

(56) References Cited

U.S. PATENT DOCUMENTS

| | | | |
|---|---|---|---|
| 10,319,242 B2 * | 6/2019 | Sindlinger | G08G 5/0004 |
| 2008/0088508 A1 * | 4/2008 | Smith | G01S 5/06 |
| | | | 342/453 |
| 2011/0169684 A1 * | 7/2011 | Margolin | G01S 5/12 |
| | | | 342/30 |
| 2012/0092208 A1 * | 4/2012 | LeMire | G01S 13/87 |
| | | | 342/29 |
| 2012/0319871 A1 * | 12/2012 | Wise | B64F 1/20 |
| | | | 340/961 |
| 2014/0104051 A1 * | 4/2014 | Breed | G06K 9/00791 |
| | | | 340/435 |
| 2016/0125746 A1 * | 5/2016 | Kunzi | G05D 1/0088 |
| | | | 701/11 |
| 2018/0246200 A1 * | 8/2018 | Goossen | G01S 5/0072 |

\* cited by examiner

COLLISION AVOIDANCE APPARATUS AND METHOD FOR VEHICLE

FIELD OF THE INVENTION

The present disclosure relates to a vehicle, and in particular to a collision avoidance apparatus and method for a vehicle.

BACKGROUND OF THE INVENTION

The automatic dependent surveillance broadcast (ADS-B) system a flight information system which integrates communication and surveillance. The ADS-B system specifies parts of signal source, information transmission channel and information processing and display. Without manual labor, The ADS-B system of an aerial vehicle automatically broadcasts information related to the aerial vehicle to other aerial vehicles and terrestrial receiving devices within a certain range, wherein the information related to the aerial vehicle comprises precise location and height, for example. The application of ADS-B technique in the civil aircraft field has been actively promoted.

The application of the radar ranging technique in the active mobile safety has developed from 24 GHz to 48 GHz and 77 GHz, and the scanning range of the radar ranging technique can reach 150 meters. The radar ranging technique is advantageous of probing the far object in both of day and night without being affected by the cloud, frog and rain. That is, the radar ranging technique is has the characteristics of all day and all weather and certain penetration, such that the radar ranging device is the essential electronic device in the commercial practice or scientific research.

The application of unmanned aerial vehicle (UAV) has been developed maturely, and the UAV can be controlled by the operator on the land for geography exploring, aerial photography or other commercial application. However, the high-altitude space is not unregulated and obstacle-free. As time goes, the number and usage of UAVs increase, and the probability that the UAV mistakenly enters the flight prohibited area also increases. As well as the obstacle in the flight space of the UAV, the aerial safety between the UAVs or the UAV and the aerial vehicle should be carefully considered when the UAV is flying.

SUMMARY OF THE INVENTION

An objective of the present disclosure is to provide a collision avoidance apparatus and method for the vehicle, so as to reduce the probability which the object or the other one vehicle collides with the vehicle itself.

An objective of the present disclosure is to provide a collision avoidance apparatus and method for the vehicle which adopt detection manners by using ADS-B system and the radar component, so as to have advantages of both of the radar ranging and the ADS-B system.

To achieve at least the above objective, the present disclosure provides a collision avoidance apparatus for a vehicle comprising: a data collection module, collecting first automatic dependent surveillance broadcast (ADS-B) data of the vehicle itself, second ADS-B data of at least other one vehicle and a detection result related to a radar reflection wave reflected from an object within a first range; and a possible collision determination/avoidance module, electrically connected to the data collection module, determining whether the other one vehicle will collide with the vehicle according to the first and second ADS-B data and whether the object will collide with the vehicle according to the detection result, so as to generate a determination result, wherein the signal processing module generate a control signal to control the vehicle perform a corresponding action according to the determination result.

To achieve at least the above objective, the present disclosure provides a vehicle having the collision avoidance apparatus.

In an embodiment of the present disclosure, the data collection module comprises: an ADS-B data reception device, electrically connected to the possible collision determination/avoidance module, receiving the first and second ADS-B data; an ADS-B data transmission device, electrically connected to the possible collision determination/avoidance module, transmitting the first ADS-B data; and a radar signal transceiving device, electrically connected to the possible collision determination/avoidance module, transmitting a radar wave to the object, and receiving the radar reflection wave.

In an embodiment of the present disclosure, the possible collision determination/avoidance module comprises: a data reception device, electrically connected to the data collection module, receiving the first and second ADS-B data and the detection result; a processing device, electrically connected to the data reception device, determining whether the other one vehicle will collide with the vehicle according to the first and second ADS-B data and whether the object will collide with the vehicle according to the detection result, so as to generate the determination result, and generating the control signal according to the determination result; and a data transmission device, electrically connected to the processing device and a control module, receiving the control signal.

In an embodiment of the present disclosure, the collision avoidance apparatus for the vehicle further comprises: a control module, electrically connected to the possible collision determination/avoidance module and at least one of actuatable and movable components of the vehicle, receiving the control signal to control the at least one of the actuatable and movable components.

In an embodiment of the present disclosure, the control module further comprises: at least one of control units, electrically connected to the at least one of the actuatable and movable components, receiving the control signal to respectively control the at least one of the actuatable and movable components; and an alarming unit, used to alarm an operator of the vehicle, such that operator operates the vehicle to avoid the other one vehicle and the object.

In an embodiment of the present disclosure, a distance and moving directions of the vehicle and the other one vehicle are obtained according to the first and second ADS-B data, and whether the other one vehicle will collide with the vehicle is determined according to the distance and the moving directions of the vehicle and the other one vehicle; wherein a distance and a radial direction of the vehicle and the object is calculated according to the detection result, and whether the object will collide with the vehicle is determined according to the distance and the radial direction of the vehicle and the object.

In an embodiment of the present disclosure, the radar signal transceiving device comprises: a radar wave transmitting module, radiating a transmitted frequency modulated signal as the radar wave; and a radar wave receiving module, electrically connected to the radar wave transmitting module and the possible collision determination/avoidance module, acquiring a received frequency modulated signal as the radar reflection wave, and generating the detection result according to the transmitted and received frequency modulated signals.

In an embodiment of the present disclosure, the vehicle is an aerial vehicle or automobile.

To achieve at least the above objective, the present disclosure provides a collision avoidance method for a vehicle, comprising: collecting first ADS-B data of the vehicle itself, second ADS-B data of at least other one vehicle and a detection result related to a radar reflection wave reflected from an object within a first range; and determining whether the other one vehicle will collide with the vehicle according to the first and second ADS-B data and whether the object will collide with the vehicle according to the detection result, so as to generate a determination result, wherein the signal processing module generate a control signal to control the vehicle perform a corresponding action according to the determination result.

In an embodiment of the present disclosure, the collision avoidance method for the vehicle further comprises: controlling at least one of the actuatable and movable components of the vehicle according the control signal.

In an embodiment of the present disclosure, a radar wave and the radar wave reflection wave are transmitted and received frequency modulated signals respectively, and the detection result is generated according to the transmitted and received frequency modulated signals.

To sum up, the collision avoidance apparatus and method for the vehicle provided by the embodiments of the present disclosure can control the vehicle to perform a corresponding action to achieve collision avoidance, such that the probability which the object or the other one vehicle collides with the vehicle itself is reduced.

DETAILED DESCRIPTION OF THE PREFERRED EMBODIMENTS

To make it easier for the examiner to understand the objects, characteristics and effects of this present disclosure, embodiments together with the attached drawings for the detailed description of the present disclosure are provided.

An embodiment of the present disclosure provides a collision avoidance apparatus and method for a vehicle, which adopt detection manners by using ADS-B system (i.e. ADS-B data reception device and ADS-B transmission device) and the radar component (i.e. radar signal transceiving device). The ADS-B system is used to collect latitudes, longitudes and multiple batches of height information of multiple vehicles (i.e. the vehicle itself and at least one of other vehicles), and the radar component is used to detect the radar reflection wave reflected from the object within the detection range.

Three-dimensional (3D) positions and moving directions of the vehicles, and distances between the other vehicles and the vehicle itself can be obtained according to the latitudes, the longitudes and the batches of height information of the vehicles. A distance and a radial velocity between the vehicle itself and the object can be obtained according to the radar reflection wave. To prevent from the collision problem, a control signal is sent to a control device according to a determination result, such that the vehicle is controlled to perform a corresponding action, and the collision avoidance is achieved.

Figure 1:
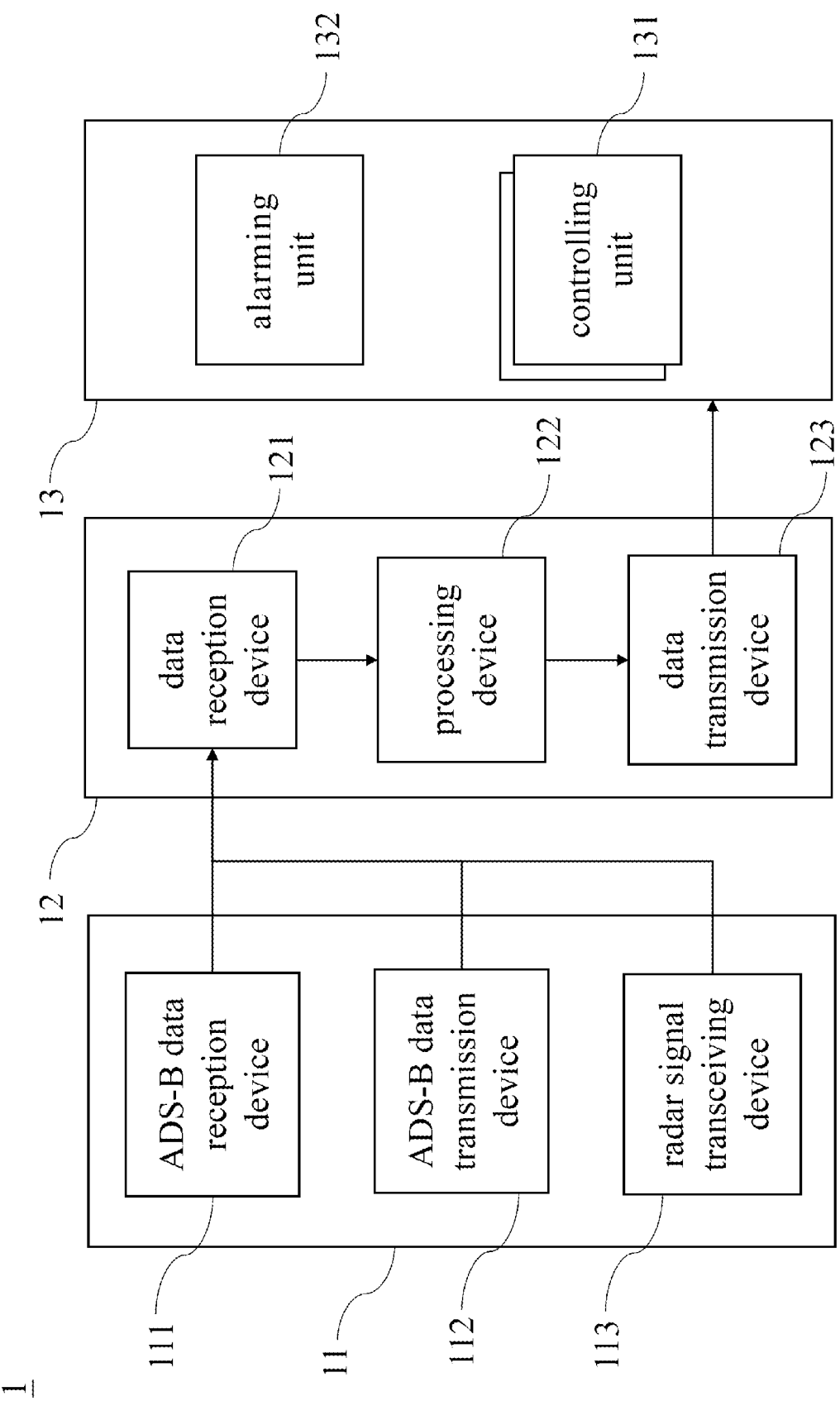
FIG. 1 is a block diagram of a collision avoidance apparatus used in a vehicle according to one embodiment of the present disclosure.

Referring to FIG. 1, FIG. 1 is a block diagram of a collision avoidance apparatus used in a vehicle according to one embodiment of the present disclosure. The collision avoidance apparatus 1 comprises a data collection module 11, a possible collision determination/avoidance module 12 and a control module 13, wherein the possible collision determination/avoidance module 12 is electrically connected between the data collection module 11 and the control module 13. The vehicle can be an aerial vehicle, and the present disclosure is not limited thereto. In other one embodiment, the vehicle can be an automobile.

The signal collection module 11 collects ADS-B data of other vehicles and the vehicle itself, and also actively transmits a radar wave to an object within a certain range to receive the radar reflection wave reflected from the object. Next, the signal collection module 11 transmits the collected ADS-B data of the vehicles and a radar detection result related to the radar reflection wave to the possible collision determination/avoidance module 12.

The possible collision determination/avoidance module 12 calculates 3D positions and moving directions of the vehicles, and distances between the other vehicles and the vehicle itself according to the collected ADS-B data of the vehicles. The possible collision determination/avoidance module 12 also calculates a distance and a radial velocity between the vehicle itself and the object. Based upon the 3D positions and the moving directions of the vehicles, the distances between the other vehicles and the vehicle itself, and the distance and the radial velocity between the vehicle itself and the object, the possible collision determination/avoidance module 12 generates a determination result to indicate whether a possible collision will happen.

Then, according to the determination result, the possible collision determination/avoidance module 12 generates a control signal to the control module 13. The control module 13 is used to control the actuatable and movable components of the vehicle according to the control signal, so as to make the vehicle perform a corresponding action to avoid the collision.

Specifically, the data collection module comprises an ADS-B data reception device 111, an ADS-B data transmission device 112 and a radar signal transceiving device 113. The possible collision determination/avoidance module 12 comprises data reception device 121, a processing device 122 and a data transmission device 123, wherein the data reception device is connected to the ADS-B data reception device 111, the ADS-B data transmission device 112 and the radar signal transceiving device 113, and the data transmission device 123 is electrically connected to the control module 13. The control module 13 comprises at least one of controlling units 131 and an alarming unit 132.

The ADS-B data reception device 111 is used to receive ADS-B data of the other vehicles and the vehicle itself. The ADS-B data of the vehicle itself can be obtained by itself (i.e. the vehicle itself can have GPS, pressure meter, whether sensor), or alternatively can be obtained from a satellite, a weather station, and/or a terrestrial station. The ADS-B data of each vehicle can comprise the identifier, the time, the latitude, the longitude, the height information, and the velocity of the vehicle. The ADS-B data transmission device 112 is used to broadcast the ADS-B data of the vehicle itself to the other vehicles or terrestrial receiving stations within a certain range.

The radar signal transceiving device 113 is used to radiate the radar wave to the object within a certain range (p.s. the certain range of the radar signal transceiving device 113 is not the same as that of the ADS-B data transmission device 112). When the radar wave contacts the object, the object reflects the radar wave to generate the radar reflection wave, and the radar reflection wave can be received by the radar signal transceiving device 113. The radar signal transceiving device 113 then generates a detection result according to the radar reflection wave. The radar wave and the radar reflection wave are respectively a transmitted and received frequency modulated signals, for example, and the present disclosure is not limited thereto.

The data reception device 121 is used to receive the ADS-B data of the vehicles and the detection result, and transmit them to the processing device 122. The processing device 122 can calculate the 3D positions of the vehicles according to the latitudes, the longitudes and the batches of the height information in the ADS-B data of the vehicles. The processing device 122 can calculate the moving directions of the vehicles according to the velocities in the ADS-B data of the vehicles. The processing device 122 can calculate the distances between the other vehicles and the vehicle itself according to the calculated 3D positions (or the latitudes, the longitudes and the batches of the height information in the ADS-B data of the vehicles). The processing device 122 can calculate the distance and the radial velocity between the vehicle itself and the object according to the detection result.

Based upon the 3D positions and the moving directions of the vehicles, the distances between the other vehicles and the vehicle itself, and the distance and the radial velocity between the vehicle itself and the object, the processing device 122 generates a determination result to indicate whether a possible collision will happen. For example, if other one vehicle moves toward the vehicle itself and the distance between the two vehicles is less than a threshold distance, the processing device 122 determines the other one vehicle may collide with the vehicle itself. For example, if a direction of the radial velocity of the object is toward the vehicle itself and the distance between the object and the vehicle itself is less than the threshold distance, the processing device 122 determines the object may collide with the vehicle itself.

The processing device 122 then generates the control signal according to the determination result. The data transmission device 123 is used to receive the control signal and transmit it to the control module 13. The vehicle has multiple actuatable and movable components respectively controlled by control units 131. For example, the vehicle can be the aerial vehicle, and the actuatable and movable components can be the right and left engines. The control units 131 control the actuatable and movable components of the vehicle according to the control signal, such that the vehicle performs the corresponding action to avoid the approaching vehicle or object. The alarming unit 132 is used to alarm the operator of the vehicle, such that the operator can control the vehicle to avoid the approaching vehicle or object.

Figure 2:
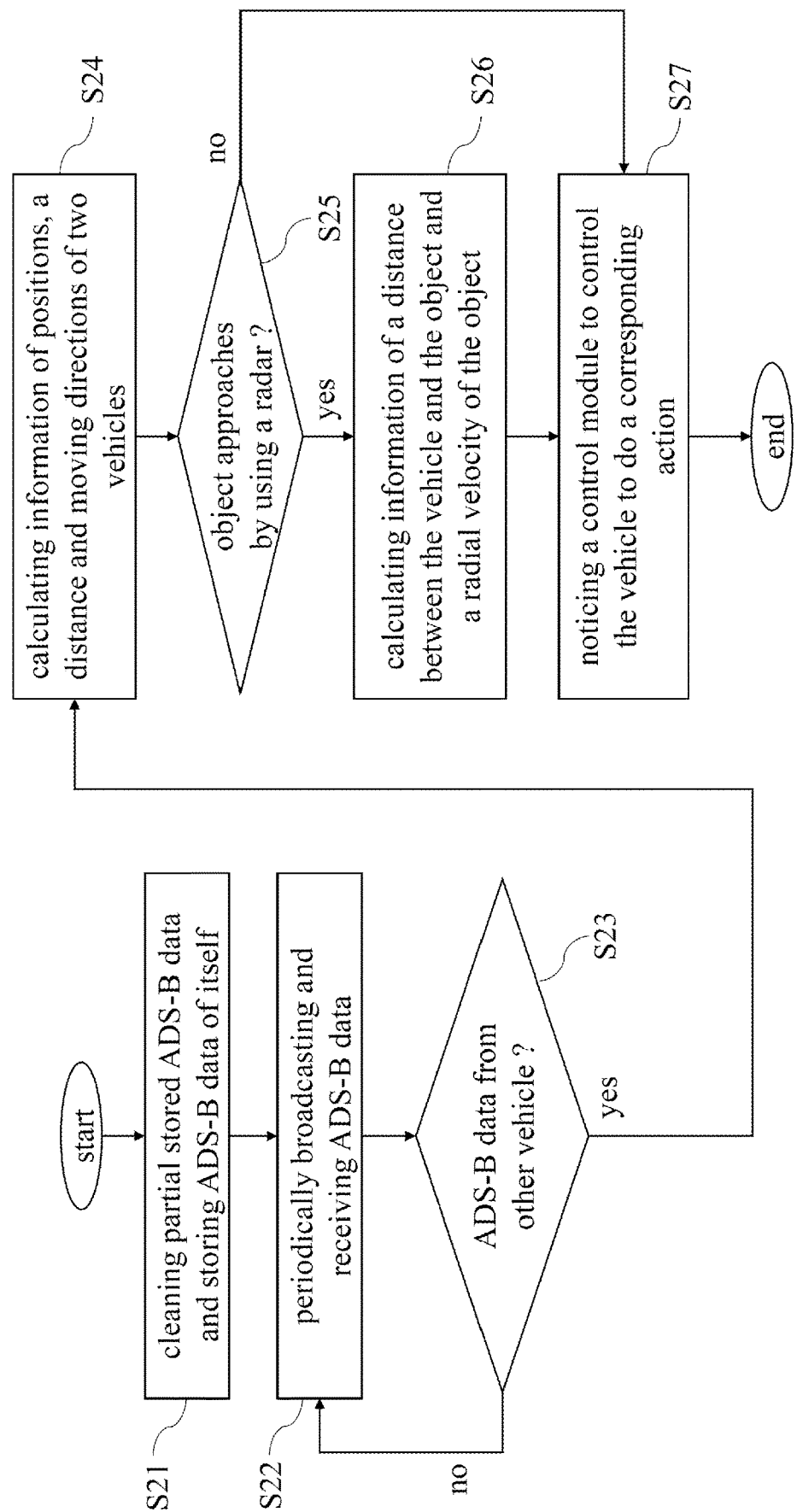
FIG. 2 is a flow chart of a collision avoidance method for a vehicle according to one embodiment of the present disclosure.

Referring to FIG. 2, FIG. 2 is a flow chart of a collision avoidance method for a vehicle according to one embodiment of the present disclosure. The collision avoidance method for the vehicle can be executed by a collision avoidance apparatus of the vehicle. At step S21, the collision avoidance apparatus cleans partial stored ADS-B data and stores the ADS-B data of itself. Step S21 is an initialization step to ensure the collision avoidance apparatus has enough storage space for storing ADS-B data of itself and other vehicles.

Next, at step S22, the collision avoidance apparatus periodically broadcasts the ADS-B data of the vehicle itself and receives the ADS-B data of the vehicle itself and other vehicles. The received ADS-B data are temporarily stored by the collision avoidance apparatus. Next, at step S23, the collision avoidance apparatus determines whether one of the ADS-B data is received from at least one of other vehicles. If the ADS-B data is received from other one vehicle (i.e. ADS-B data of other one vehicle is received), step S24 will be executed; otherwise, step S22 will be executed again.

Then, at step S24, the collision avoidance apparatus calculates the information of positions (for example 3D positions), a distance and moving directions of the two vehicles (i.e. the vehicle itself and the other one vehicle) according to the ADS-B data of the two vehicles. Then, at step S25, the collision avoidance apparatus determines whether an object is approaching the vehicle itself by using a radar (such as the radar signal transceiving device). If the object is approaching the vehicle itself, step S26 will be executed; otherwise, step S27 will be executed.

Next, at step S25, the collision avoidance apparatus calculates information of a distance between the vehicle and the object and a radial velocity of the object according to the radar reflection wave. Next, at step S27, according to the information calculated from steps S24 and S26 (if step S26 is executed), the collision avoidance apparatus notices a control module to control the vehicle to do a corresponding action, so as to avoid the collision of the vehicle itself and the other one vehicle or the approaching object. It is noted that the sequence of above steps S21 through S27 is not used to limit the present disclosure. For example, steps S25 and S26 may be executed before step S22.

Figure 3:
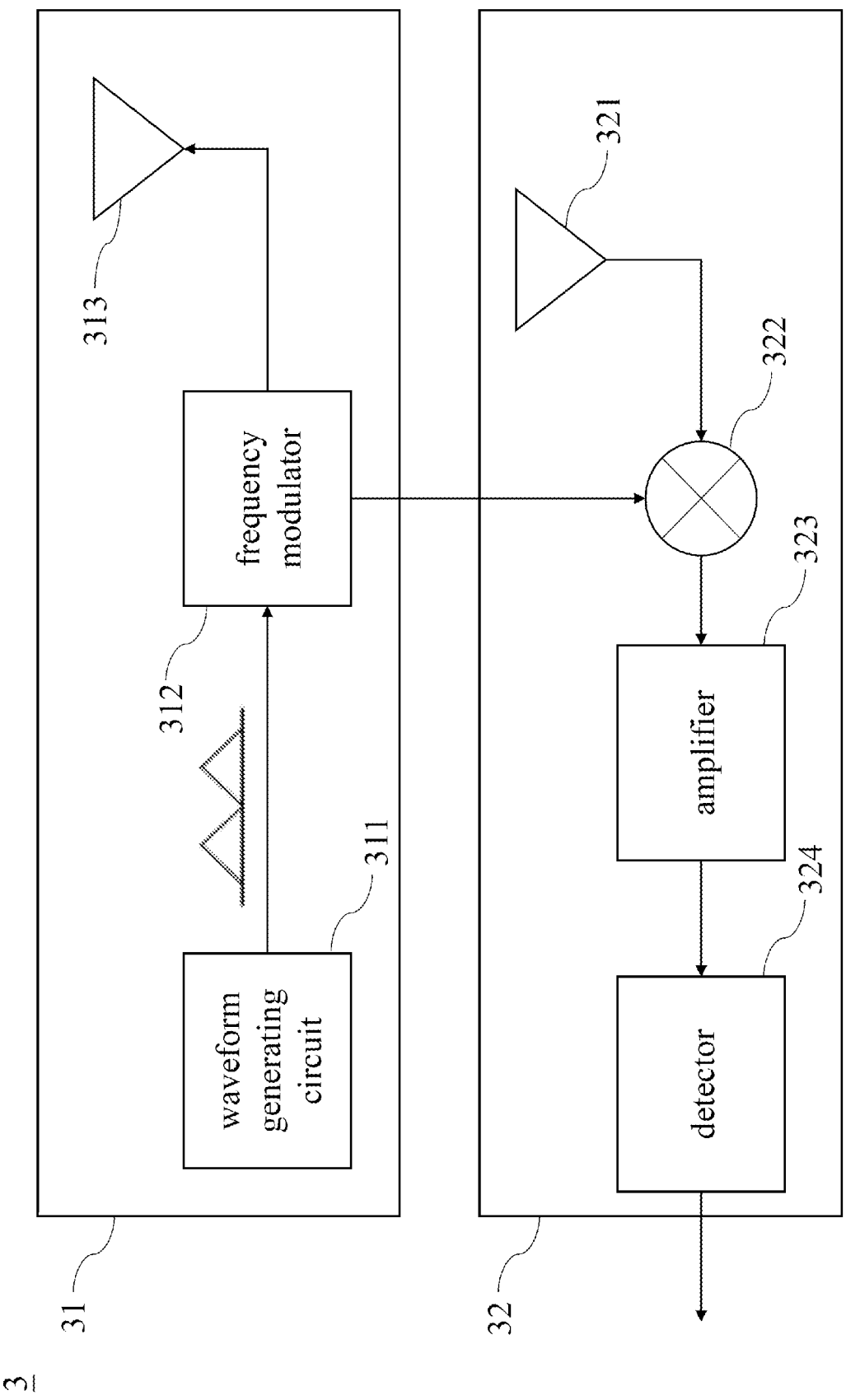
FIG. 3 is a block diagram of a radar signal transceiving device according to an embodiment of the present disclosure.

One implementation of the radar signal transceiving device is illustrated as follows, and the present disclosure is not limited thereto. Referring to FIG. 3, FIG. 3 is a block diagram of a radar signal transceiving device according to an embodiment of the present disclosure. The radar signal transceiving device 3 comprises a radar wave transmitting module 31 and a radar reflection wave receiving module 32, wherein the radar wave transmitting module 31 is electrical connected to the radar reflection wave receiving module 32.

The radar wave transmitting module 31 is used to generate a transmitted frequency modulated signal as the radar wave to probe the object within a certain range. The radar reflection wave receiving module 32 is used to detect a received frequency modulated signal as the radar reflection wave to generate the detection result which indicates the radial velocity and the distance between the object and the vehicle.

The radar wave transmitting module 31 comprises a waveform generating circuit 311, a frequency modulator 312 and an antenna 313, wherein the frequency modulator 312 is electrically connected to the antenna 313 and the waveform generating circuit 311. The waveform generating circuit 31 is used to generate a triangle waveform signal to the frequency modulator 312. The frequency modulator 312 receives the triangle waveform signal and modulates a carrier signal according to the triangle waveform signal, so as to generate the transmitted frequency modulated signal. The antenna 313 is used to radiate the transmitted frequency modulated signal.

The radar reflection wave receiving module 32 comprises an antenna 321, a mixer 322, an amplifier 323 and a detector 324. The mixer 322 is electrically connected to the antenna 321, the frequency modulator 312 and the amplifier 323. The detector 324 is electrically connected to the amplifier 324 and the data reception device. The antenna 321 acquires the received frequency modulated signal. The mixer 323 mixes the transmitted and received frequency modulated signals to obtain a mixing signal. The amplifier 323 amplifies the mixing signal, and the detector 324 detects the mixing signal to obtain the frequency deviation of the transmitted and received frequency modulated signals. The detector 324 can obtain a detection result from the frequency deviation of the transmitted and received frequency modulated signals, wherein the frequency deviation conveys information of the distance and the radial velocity between object and the vehicle itself.

Figure 4:
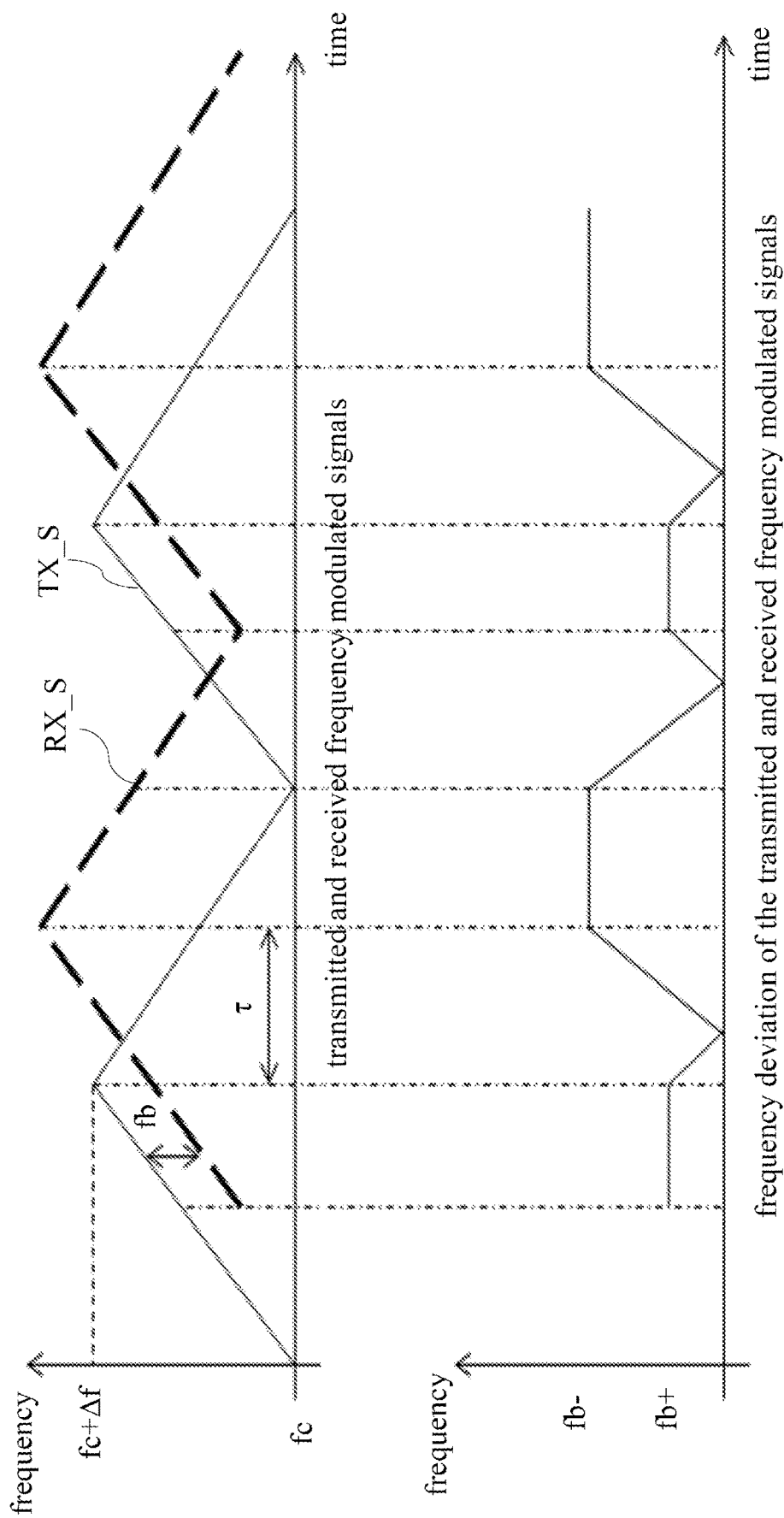
FIG. 4 is a curve diagram showing a transmitted and received frequency modulated signals of a radar signal transceiving device and their frequency deviation according to an embodiment of the present disclosure.

Next, referring to FIG. 4, FIG. 4 is a curve diagram showing a transmitted and received frequency modulated signals of a radar signal transceiving device and their frequency deviation according to an embodiment of the present disclosure. Due to Doppler effect, the frequency shift exists in the transmitted and received frequency modulated signals TX_S, RX_S when relative motion of the object and the vehicle itself exist. As shown in FIG. 4, frequency of the transmitted frequency modulated signal TX_S is fc through fc+Δf, and the received frequency modulated signal RX_S is a delayed (p.s. the delay is τ) and frequency shifted (p.s. the frequency shift is fb) version of the transmitted frequency modulated signal TX_S.

The frequency deviation of the transmitted and received frequency modulated signals TX_S, RX_S is also shown in FIG. 4, the frequency peak of the transmitted frequency modulated signal TX_S corresponds to the frequency deviation fb+, and the frequency peak of the received frequency modulated signal RX_S corresponds to the frequency deviation fb−. The time between the frequency deviation fb+ and fb− is the delay time τ. Therefore, by solving Doppler equations fb=(v/2c)*fc and the distance equation R=cτ/2, the distance R and the radial velocity v between object and the vehicle itself can be obtained, wherein c is the light velocity and fc is the carrier frequency.

In collusion, the collision avoidance apparatus and method for a vehicle provided by the embodiments of the present disclosure adopt detection manners by using ADS-B system and the radar component to respectively sense whether the other one vehicle is approaching the vehicle itself and whether the object is approaching the vehicle itself. Thus, the vehicle is controlled to perform a corresponding action to achieve collision avoidance.

While the present disclosure has been described by means of specific embodiments, numerous modifications and variations could be made thereto by those skilled in the art without departing from the scope and spirit of the present disclosure set forth in the claims.

What is claimed is:

1. A collision avoidance apparatus for a vehicle, comprising:
    a data collection module, collecting first automatic dependent surveillance broadcast (ADS-B) data of the vehicle itself, second ADS-B data of at least other one vehicle and a detection result related to a radar reflection wave reflected from an object within a first range;
    a possible collision determination/avoidance module, electrically connected to the data collection module, determining whether the other one vehicle will collide with the vehicle according to the first and second ADS-B data and whether the object will collide with the vehicle according to the detection result, so as to generate a determination result, wherein a signal processing module generate a control signal to control the vehicle to perform a corresponding action according to the determination result; and
    a control module, electrically connected to the possible collision determination/avoidance module and at least one of actuatable and movable components of the vehicle, receiving the control signal to control the at least one of the actuatable and movable components,
    wherein the control module comprises:
    at least one of control units, electrically connected to the at least one of the actuatable and movable components, receiving the control signal to respectively control the at least one of the actuatable and movable components; and
    an alarming unit, used to alarm an operator of the vehicle, such that operator operates the vehicle to avoid the other one vehicle and the object.

2. The collision avoidance apparatus for the vehicle according to claim 1, wherein the data collection module comprises:
    an ADS-B data reception device, electrically connected to the possible collision determination/avoidance module, receiving the first and second ADS-B data;
    an ADS-B data transmission device, electrically connected to the possible collision determination/avoidance module, transmitting the first ADS-B data; and
    a radar signal transceiving device, electrically connected to the possible collision determination/avoidance module, transmitting a radar wave to the object, and receiving the radar reflection wave.

3. The collision avoidance apparatus for the vehicle according to claim 2, wherein the radar signal transceiving device comprises:
    a radar wave transmitting module, radiating a transmitted frequency modulated signal as the radar wave; and
    a radar wave receiving module, electrically connected to the radar wave transmitting module and the possible collision determination/avoidance module, acquiring a received frequency modulated signal as the radar reflection wave, and generating the detection result according to the transmitted and received frequency modulated signals.

4. The collision avoidance apparatus for the vehicle according to claim 1, wherein the possible collision determination/avoidance module comprises:
    a data reception device, electrically connected to the data collection module, receiving the first and second ADS-B data and the detection result;
    a processing device, electrically connected to the data reception device, determining whether the other one vehicle will collide with the vehicle according to the first and second ADS-B data and whether the object will collide with the vehicle according to the detection result, so as to generate the determination result, and generating the control signal according to the determination result; and a data transmission device, electrically connected to the processing device and a control module, receiving the control signal.

5. The collision avoidance apparatus for the vehicle according to claim 1, wherein three-dimensional (3D) positions, a distance and moving directions of the vehicle and the other one vehicle are obtained according to the first and second ADS-B data, and whether the other one vehicle will collide with the vehicle is determined according to the distance and the moving directions of the vehicle and the other one vehicle; wherein a distance and a radial direction of the vehicle and the object is calculated according to the detection result, and whether the object will collide with the vehicle is determined according to the distance and the radial direction of the vehicle and the object.

6. The collision avoidance apparatus for the vehicle according to claim 1, wherein the vehicle is an aerial vehicle or automobile.

7. A vehicle, comprising:
   at least one of actuatable and movable components; and
   a collision avoidance apparatus for the vehicle, comprising:
      a data collection module, collecting first ADS-B data of the vehicle itself, second ADS-B data of at least other one vehicle and a detection result related to a radar reflection wave reflected from an object within a first range;
      a possible collision determination/avoidance module, electrically connected to the data collection module, determining whether the other one vehicle will collide with the vehicle according to the first and second ADS-B data and whether the object will collide with the vehicle according to the detection result, so as to generate a determination result, wherein a signal processing module generate a control signal to control the vehicle to perform a corresponding action according to the determination result; and
      a control module, electrically connected to the possible collision determination/avoidance module and the at least one of the actuatable and movable components of the vehicle, receiving the control signal to control the at least one of the actuatable and movable components, wherein the control module comprises:
         at least one of control units, electrically connected to the at least one of the actuatable and movable components, receiving the control signal to respectively control the at least one of the actuatable and movable components; and
         an alarming unit, used to alarm an operator of the vehicle, such that operator operates the vehicle to avoid the other one vehicle and the object.

8. The vehicle according to claim 7, wherein the data collection module comprises:
   an ADS-B data reception device, electrically connected to the possible collision determination/avoidance module, receiving the first and second ADS-B data;
   an ADS-B data transmission device, electrically connected to the possible collision determination/avoidance module, transmitting the first ADS-B data; and
   a radar signal transceiving device, electrically connected to the possible collision determination/avoidance module, transmitting a radar wave to the object, and receiving the radar reflection wave.

9. The vehicle according to claim 8, wherein the radar signal transceiving device comprises:
   a radar wave transmitting module, radiating a transmitted frequency modulated signal as the radar wave; and
   a radar wave receiving module, electrically connected to the radar wave transmitting module and the possible collision determination/avoidance module, acquiring a received frequency modulated signal as the radar reflection wave, and generating the detection result according to the transmitted and received frequency modulated signals.

10. The vehicle according to claim 7, wherein the possible collision determination/avoidance module comprises:
    a data reception device, electrically connected to the data collection module, receiving the first and second ADS-B data and the detection result;
    a processing device, electrically connected to the data reception device, determining whether the other one vehicle will collide with the vehicle according to the first and second ADS-B data and whether the object will collide with the vehicle according to the detection result, so as to generate the determination result, and generating the control signal according to the determination result; and
    a data transmission device, electrically connected to the processing device and a control module, receiving the control signal.

11. The vehicle according to claim 7, wherein 3D positions, a distance and moving directions of the vehicle and the other one vehicle are obtained according to the first and second ADS-B data, and whether the other one vehicle will collide with the vehicle is determined according to the distance and the moving directions of the vehicle and the other one vehicle; wherein a distance and a radial direction of the vehicle and the object is calculated according to the detection result, and whether the object will collide with the vehicle is determined according to the distance and the radial direction of the vehicle and the object.

12. The vehicle according to claim 7, wherein the vehicle is an aerial vehicle or automobile.

13. A collision avoidance method for a vehicle, comprising:
    collecting first ADS-B data of the vehicle itself, second ADS-B data of at least other one vehicle and a detection result related to a radar reflection wave reflected from an object within a first range; and
    determining whether the other one vehicle will collide with the vehicle according to the first and second ADS-B data and whether the object will collide with the vehicle according to the detection result, so as to generate a determination result, wherein a signal processing module generate a control signal to control the vehicle to perform a corresponding action according to the determination result,
    wherein 3D positions, a distance and moving directions of the vehicle and the other one vehicle are obtained according to the first and second ADS-B data, and whether the other one vehicle will collide with the vehicle is determined according to the distance and the moving directions of the vehicle and the other one vehicle; wherein a distance and a radial direction of the vehicle and the object is calculated according to the detection result, and whether the object will collide with the vehicle is determined according to the distance and the radial direction of the vehicle and the object.

14. The collision avoidance method for the vehicle according to claim 13, further comprising:
    controlling a plurality of actuatable and movable components of the vehicle according to the control signal.

15. The collision avoidance method for the vehicle according to claim 13, wherein a radar wave and a radar wave reflection wave are transmitted and received frequency modulated signals respectively, and the detection result is generated according to the transmitted and received frequency modulated signals.

16. The collision avoidance method for the vehicle according to claim 13, wherein the vehicle is an aerial vehicle or automobile.

\* \* \* \* \*